Lane & Bolles.
App's for Raising Sunken Vessels.
N° 58,842. Patented Oct. 16, 1866.
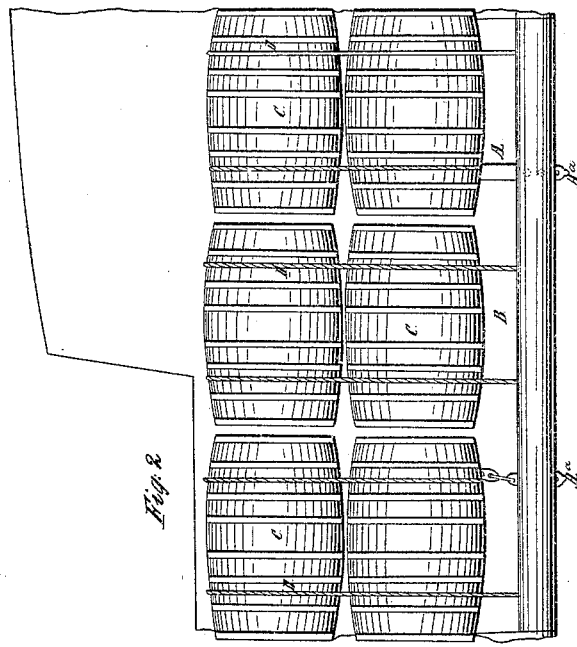
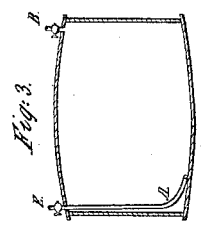
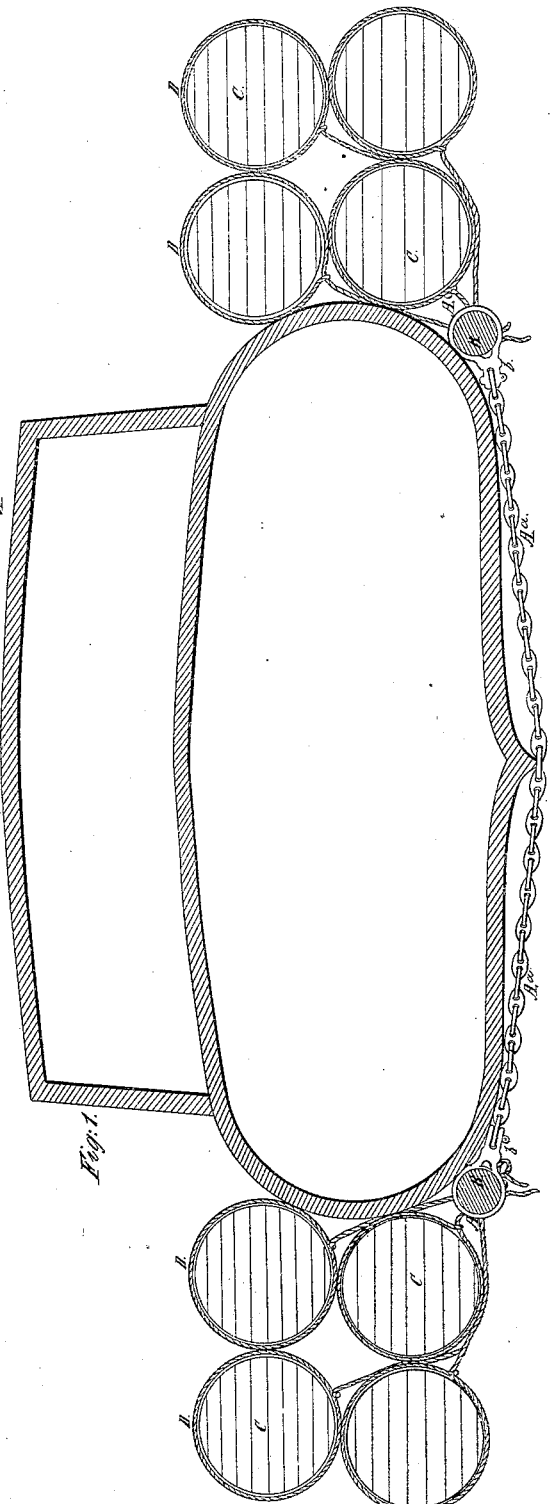
Witnesses.
W. H. Haynard.
Henry Schmitz.
Inventor.
G. M. Lane.
Jesse N. Bolles

UNITED STATES PATENT OFFICE.

GEORGE W. LANE AND J. N. BOLLES, OF BALTIMORE, MARYLAND.

IMPROVED MEANS FOR RAISING SUNKEN VESSELS.

Specification forming part of Letters Patent No. 58,842, dated October 16, 1866.

*To all whom it may concern:*

Be it known that we, GEORGE W. LANE and JESSE N. BOLLES, of Baltimore, in the county of Baltimore, in the State of Maryland, have invented a new and Improved Mode of Raising Sunken Vessels, particularly those constructed of iron, such as monitors and rams, and the larger wooden vessels; and we do hereby declare that the following is a full and exact description thereof, reference being had to the accompanying drawings, and to the letters of reference marked thereon.

The nature of our invention consists in adapting pontons or casks to the outsides of sunken vessels, and securing them to spars, logs, or chains running both lengthwise and crosswise of the vessel, which in turn must be properly secured to substantial chains or bars of iron passing beneath and under the vessel in such a manner as to perfectly equalize the strain upon each of the chains while lifting; and in knowing the exact lifting-power applied to each section we avoid the danger of breaking chains, and thereby insure with certainty the success of the operation. We also expel the water from the casks, after they have been secured to the spars, by forcing air into them through a tube or hose connected with a brass cock at the top or other convenient point of the cask, which causes the water to leave the cask through another cock or valve, placed also at any convenient part of the ponton or cask, and thus by multiplying them we have all the requisite power needed to raise any vessel to which this invention shall be properly applied.

To enable others skilled in the art to make and use our invention, we will proceed to describe its construction and operation.

The accompanying drawings represent sections of an iron vessel one hundred and fifty-six feet in length, thirty-six feet beam, and thirteen and one-half feet depth of hold. The spars or logs B, Figures 1 and 2, six of which are placed upon each side of the vessel, (and also crosswise if necessary, under her bow and stern,) are twenty inches or more in diameter, and the four middle or inner ones, upon each side, are twenty-four feet in length, while those at the end are thirty feet long.

There are twelve chains, or their equivalent, A *a*, Figs. 1 and 2, extending beneath the vessel, made of best hammered iron, and of two-inch links, having been tested to twice the required strain, and enlarged at the end links, so as to admit a large pin, which connects the chain to the spar by means of a strap or chain, A, Fig. 1.

The pontons are made of two-inch seasoned white pine, five feet inside diameter, seven feet and four inches between the heads, or eight feet over all, lifting capacity being four and a quarter net tons each, and should be well hooped and made with care, and are to be secured to the spars by means of slings made of five-inch hemp rope, and two of them to each cask, (see B C D, Fig. 1,) and of different lengths. Each ponton has a brass stop-cock upon its upper side, B, Fig. 3, to which is attached a flexible hose, which is connected with an air-pump above the surface of the water, through which air is forced into the cask, which expels the water therefrom through the tube A and cock E, or by and through the valve F, if more desirable. In either case the casks can be readily refilled by submerging them under water.

To commence operations, we place the chains, twelve in number, beneath the vessel to be raised crosswise, and twelve feet apart. We then secure one end of each of two chains to one of the spars, twenty-four feet long, B, Fig. 1, by a chain or strap, A, Fig. 1, and pin *b*, upon each side of the vessel, thus constituting one section, from O to O, Fig. 2, the chains being twelve feet apart and six feet from either end of the spar, thus equalizing the strain, both chains lifting exactly alike and in proportion to the pontons applied, which is done by securely attaching to each a hemp rope or sling at or near both ends, so as not to slip off, when it is lowered and secured to a spar by lashing or by sister hooks. Then, as each successive row of casks become inflated by the air-pump, which expels the air therefrom, they take their natural and lifting position, and the tops of the upper tier should be somewhat lower than the deck of the vessel. We also, in order to make all sure, pass a smaller chain from stem to stern, taking a turn around each of the under chains and securing it properly both fore and aft, when, if necessary, we also secure an extra spar both under the bow and stern, to which we attach some thirty additional casks, besides what may be added to the longer or outer spars, which, being thirty feet long each, will give fifty additional casks, or, in the aggregate, upward of one thousand net tons displacement.

Finally, when all has been thus secured, we apply the air-pump to the remaining casks alternately upon either side, until the displacement is sufficient to raise the vessel.

We are aware that pontons or casks have been used for raising vessels, but not in the manner as proposed by us.

What we claim as our invention, and desire to secure by Letters Patent, is—

The combination of the spars B, chains A $a$, pontons or casks C, with the tubes and cocks, all operating substantially as and for the purpose specified.

G. W. LANE.
JESSE NORRIS BOLLES.

Witnesses:
W. H. HAYWARD,
HENRY SCHMITZ.